Jan. 17, 1939.  W. L. CLOUSE  2,143,861
CLUTCH
Filed July 13, 1935
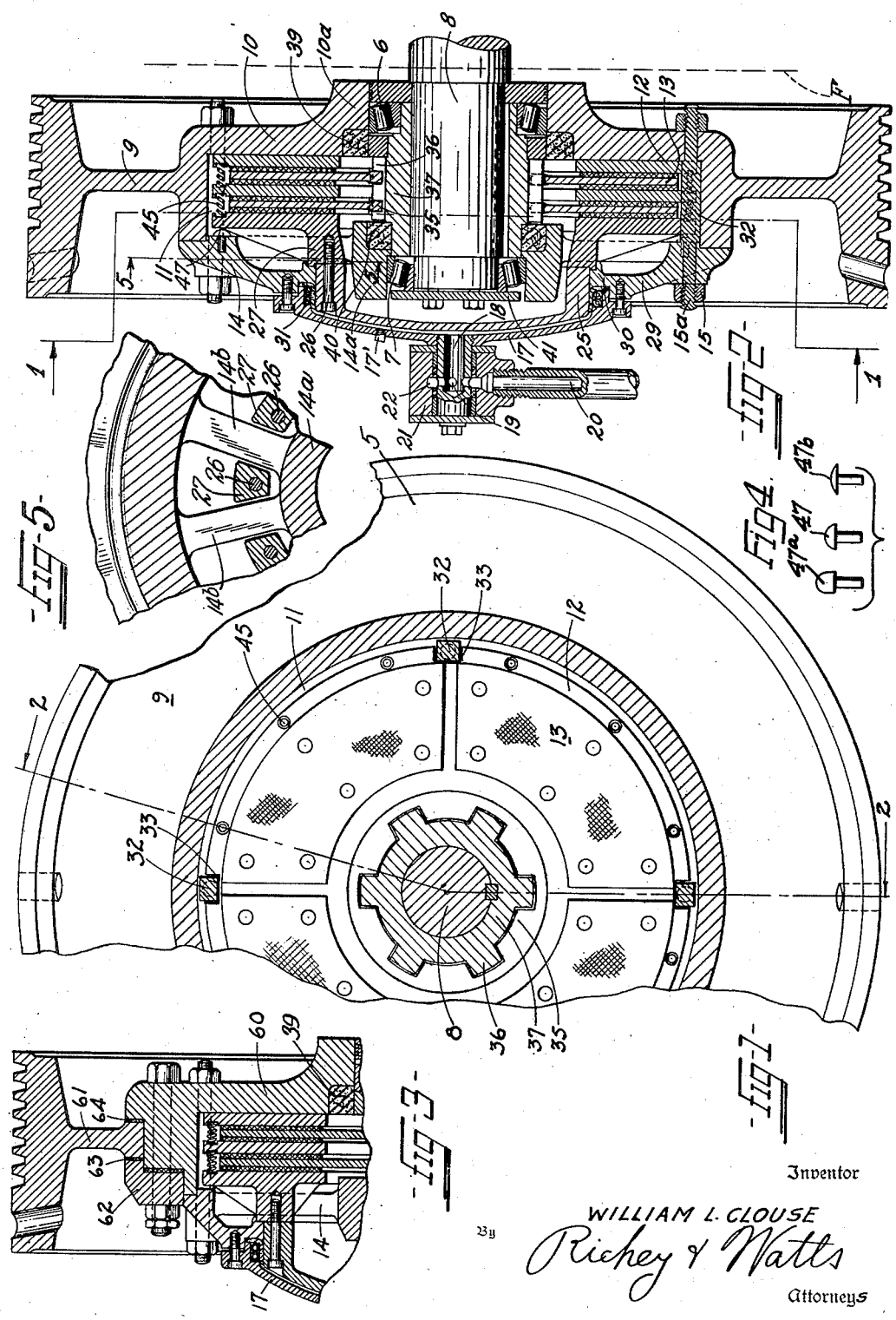
Inventor
WILLIAM L. CLOUSE
By Richey & Watts
Attorneys Patented Jan. 17, 1939

2,143,861

UNITED STATES PATENT OFFICE

2,143,861

CLUTCH

William L. Clouse, Tiffin, Ohio, assignor to The National Machinery Company, Tiffin, Ohio, a corporation of Ohio Application July 13, 1935, Serial No. 31,251

12 Claims. (Cl. 192—85)

This invention relates to a clutch mechanism and more particularly to an air clutch mechanism suitable for operating forging machines, presses and other heavy machinery. For the purpose of illustrating and describing my invention I will refer to it in the environment of a forging machine, but those skilled in the art will appreciate that the application of the principles of my clutch or the clutch itself may be well suited to other uses.

The rapid failure of heavy duty friction clutches heretofore employed in machines of the character referred to has been attributed to the heat developed by slippage in the clutch during engagement and disengagement of the clutch parts. The heat developed adversely affects the frictional material employed to line the clutch plates and exerts a warping action on the clutch plates.

It is extremely desirable to reduce the slippage in the clutch to a minimum and thus remove the cause of clutch failure, and it is among the objects of this invention to arrange the cylinder and plunger of an air clutch with respect to an air inlet in a manner to reduce the time required to effect clutch engagement or disengagement. It is a further object of the invention to arrange the driving and driven members of a clutch within a forging machine flywheel and to actuate the members so arranged by a plunger and cylinder assembly mounted outside of the flywheel and at the end of the flywheel axis. A further object of the invention is to mount the driving and driven parts of an air clutch between spaced bearing assemblies of a flywheel and actuate said parts by means outside of said bearing assemblies.

A further object of the invention is to provide a fluid pressure actuated clutch wherein relatively heavy accurately machined springs are employed to normally maintain the clutch plates disengaged and to center a driven clutch plate between a pair of driving clutch plates.

A further object of the invention is to provide a fluid pressure actuated clutch wherein annular driving and driven clutch discs surround a flywheel shaft and an actuating cylinder supported by said flywheel is so arranged that the radial area of the cylinder may exceed the radial area of the clutch plates without extending beyond the outer perimeter of the clutch plates.

Other objects relating to details of construction and economies of manufacture will appear hereinafter.

In my invention as adapted to a forging machine I preferably attain the objects enumerated above by providing a clutch which may be associated with a flywheel of the forging machine and which preferably comprises driving rings or plates in splined engagement with the flywheel, and friction discs or driven members in splined engagement with the flywheel shaft. The driving rings or plates are preferably moved into engagement with the friction discs by air or fluid pressure means carried by the flywheel and in which a plunger is adapted to engage parts of one of the rings projecting between spokes of the flywheel. By means of springs arranged between the rings or plates the plates are moved out of driving engagement with the friction discs.

In the accompanying drawing, which illustrates a preferred embodiment of the invention:

Figure 1 is an elevation partly in section of a clutch constructed according to my invention, the parts in section being on line 1—1 of Figure 2;

Figure 2 is a vertical sectional view taken on the line 2—2 of Figure 1;

Figure 3 is a partial sectional showing of a modified form of clutch and flywheel assembly;

Figure 4 is an elevation showing clutch adjusting devices;

Figure 5 is a partial sectional view taken along the line 5—5 of Figure 2 showing the spoke-like structure of the clutch housing.

In a heavy duty machine of the type referred to it is important because of the massive rotating parts mounted thereon that the unsupported length of shaft projecting from the bed frame be reduced to a minimum. Where a friction clutch is to be incorporated in a flywheel on a projecting shaft it is necessary to provide a splined sleeve keyed to the shaft and this in turn necessitates the provision of spaced flywheel bearings. For obvious reasons it is important to maintain the center of gravity of the combined clutch and flywheel within the projecting portion of the shaft. Although the advantages of a cylinder and plunger with a circular cross section over a cylinder and plunger having an annular shape are known, considerable difficulty is encountered where it is desired to employ a cylinder with a circular cross section to actuate a clutch within a forging machine flywheel because of the necessity for an outer flywheel bearing. Among the advantages of a round cylinder over an annular cylinder are found in the difference in cost between machining a round cylinder and an annular groove cylinder and the difference in cost between machining a round piston and an annular piston. An annular piston requires sealing means on two peripheries whereas a round piston requires but one. In the clutch to be hereinafter described in detail I have provided a round clutch actuating cylinder having the above described advantages and I have supported the actuating mechanism through the clutch on a projecting flywheel shaft no longer than required to support the flywheel and I have supported the actuating mechanism without resort to external support means co-axial with the flywheel shaft.

In a preferred embodiment of the invention as illustrated in Figure 1, the flywheel which supports the entire clutch mechanism is indicated generally as 5 and is supported for free rotation through anti-friction bearings 6, 7 upon a shaft 8 projecting from the bed frame F of a forging or like machine (shown in dotted outline). The flywheel proper comprises a shallow drum-shaped main section 10 integrally formed with a hub and the wheel rim and a removable section 14 which includes a radially extending apertured wall or spoke-like structure 14b terminating in a hub portion 14a. The two sections are axially spaced from each other to provide between the wall 10 and the apertured wall 14b a compartment 11 to house the driving and driven plates of a friction clutch and to provide spaced hub bearing portions 10a and 14a for the flywheel.

To maintain the driven clutch parts fixed with respect to the shaft 8, the shaft is provided with a sleeve 37 keyed thereto and formed on its outer face with axially extending teeth 36 having a splined engagement with the driven clutch discs 13 as at 35. The sleeve 37 is cut away on that side adjacent the hub portion 10a and supports in said cut away portion an anti-friction bearing 6. The outer bearing assembly 7 is supported directly on the main shaft 8 and is arranged between a bearing face on the hub portion 14a and the shaft. Sealing means 39 and 40 are carried by the hub portions 10a and 14a respectively to prevent grease or other material from entering the clutch plate compartment. The bearing 7 provided for the apertured radial wall 14b is clamped in position by means of a plate 41 bolted to the outer end of the shaft 8. The rollers of the anti-friction bearing are inclined and also function as thrust bearings and retain the wheel assembly on the shaft 8.

The drum shaped wheel portion 10 provides a continuous radial wall extending from the hub to the web 9 of the wheel rim where it terminates in an axially extending flange concentric with the shaft 8. As illustrated in Figure 1 the inner wall of the flange is formed to present a series of perimetrically spaced square blocks 32 which fit within a like plurality of square slots 33 formed in the driving clutch parts 12. One of the driving clutch plates 12 which may be referred to as the inner plate is shown as abutting the radial wall of the portion 10, the outer driving plate is positioned adjacent the removable wheel portion 14 and the intermediate driving plate is arranged between a pair of driven plates 13. It will be understood that the number of friction plates or the type of friction means arranged within the compartment 11 may be other than as illustrated. The driven plates 13 are provided on both faces with friction material and are axially movable in the housing through the splined engagement 35—36. In order to compress the stack of driving and driven plates within the compartment 11 the outer driving plate 12 is provided with a series of projections 27 arranged to extend outwardly through the apertured wall or spoke-like structure 14b (Figure 5) where the portions 27 are engaged by an actuating means hereinafter described.

A plurality of perimetrically spaced buttons 47 are removably mounted in the wheel section 14 and are positioned to engage the outer driving plate 12 to limit its outward movement. The extent of the plate movement within the housing may be changed by the substitution of buttons having larger or smaller heads such as 47a and 47b shown in Figure 4. The buttons 47 as arranged control the relative movement between the driving and driven plates and thus may be changed to effect adjustments for wear of the clutch frictional faces. It will be noted that this type of adjusting means is not subjected to thrust during clutch engagement and that the clutch plates bear aaginst the flat massive wall 10 of the flywheel. Among the advantages that flow from this arrangement is that no adjustment can be made which would tend to tilt the plates within the clutch housing during clutch engagement.

To insure full and rapid separation of the clutch plates upon removal of the actuating pressure and to center the middle driving plate I have arranged a plurality of compression springs 45 between the driving plates. The springs 45 are retained in position by a like plurality of aligned recesses formed in the opposed faces of the driving plates and are accurately machined to exert a uniform pressure about the periphery of the plates during clutch engagement. The springs 45 are relatively heavy and due to accurate machining prior to assembly are proportioned to exert no expanding force prior to clutch actuation but immediately upon clutch actuation exert considerable disengaging force. This results in a very rapid disengaging movement of the clutch plates and the disposition of springs on either side of the central driving plate prevents any tendency for the driven plates to adhere thereto.

To support the actuating mechanism for the clutch I preferably form the removable wheel section 14 with an outwardly extending annular bracket portion 29 which terminates in an axially extending flange 30 concentric with the flywheel adjacent the projections 27 extending from the outer driving plate between the apertures of the spoke-like section 14b. The inner edge of the flange functions as abutment for the projections 27 and the concentric wall of the flange functions as a part of the cylinder to receive a plunger 25. A dome-shaped cylinder 17 is secured at its periphery by bolts or analogous fastening means to the portion 29 and is provided at its junction with a combined gasket and sealing ring 31. A flexible part of the sealing ring assembly is arranged between the radial abutting faces of parts 29 and 17 to serve as a gasket therein and a lateral extension of the flexible ring extends parallel to the cylinder wall portion to engage and seal the plunger 25 in the cylinder. The flexible member may be urged into sealing position by a coil spring. The plunger or piston 25 comprises a shallow dome-shaped member secured to the projections 27 of the outer driving plate, and is mounted to have a limited axial movement in the cylinder formed by the cylinder part 17 and the cylinder wall part on the flange 30.

To conduct air or other fluid actuating medium into the cylinder, the outer face of the head portion 17 is provided with a projecting inlet chamber 18 formed with a plurality of apertures 19 which co-operate with a groove 22 of a rotatably mounted fitting 21. A conduit 20 carried by the fitting communicates with the groove 22 formed therein and sealing means may be provided on each side of the groove 22 to prevent escape of the actuating fluid. A plate or analogous means may be secured to the outer end of the inlet chamber 18 to secure the fitting thereto. An aperture 17' is formed in the cylinder head 17 for the insertion of a rod to measure the axial movement of the plunger 25 within the cylinder.

To assemble the clutch the stack of alternate driving and driven plates 12 and 13 with the springs 45 are arranged on the wheel section 10 and clamped in place by securing the removable wheel section 14 in position by application of nuts 15 to threaded members 15a which project from the blocks 32. The plunger 25 is secured through screw means 26 to the projections 27 of the outer driving plate. The cylinder part 17 carrying the air conduit 20 which leads from an air line or tank and through a control mechanism is next bolted in place on the part 29 and the clutch is ready for operation. It will be observed that the method of assembly effected through my construction permits a removal of the cylinder part 17 and plunger without disturbing the clutch plate assembly or the outer bearing support for the wheel. The central location of the air cylinder permits a rapid entry and exit for the actuating medium and a rapid clutch engaging action. The air inlet conduit must of necessity be located at the center of the shaft and any cylinder positioning other than in alignment with the air inlet requires tortuous passageways which exert a retarding effect on the flow of air and in the event that one of such passageways should become unobstructed the piston would bind in the cylinder. One of the advantages of my centrally located piston is that air moving into the piston is free to flow evenly in all directions over the piston and makes the piston in effect "self-centering".

In the operation of the clutch a trip mechanism (not shown) admits air into conduit 20 and thence to the cylinder 17. The initial force exerted by the pressure on the plunger 25 is employed to overcome the inertia of the relatively massive driving clutch parts 12. When this inertia is overcome the driving plates rapidly and forcibly move into engagement with the driven plates. The total distance which the driving plates move to effect disengagement is not sufficient to permit the plates to acquire any great velocity and thus the momentum is insufficient to cause the driving members to bounce or "chatter" when effecting clutch engagement. When a valve is opened to permit the air to escape from the cylinder the springs which have been compressed by clutch engaging movement rapidly effect a separation of the clutch surfaces. Since the air in the cylinder is not required to pass through any small or tortuous passages to get into or out of the cylinder the plunger responds quickly to the valve admitting the air and to the compression springs when the air is released. Due to the rapidity of engagement and disengagement the clutch action is like a pin clutch but retains the smooth engagement and flexibility characteristic of friction clutches.

The force exerted by the cylinder and piston when the clutch plates are engaged reacts against the flange 29, which forms a substantially radial wall connected to the wheel flange of the main section 10, and the flat radial surface of the section 10. Thus there is no reaction or force exerted on the apertured wall or spoke like structure 14b or the hub portion 14a. As a consequence there is no end thrust exerted during the engagement of the clutch on either of the bearings 6 or 7, since all of the thrust is taken by the radial wall 29 and the radial wall of the section 10 which are connected together adjacent the axially extending flange of the section 10.

While I have found the form of clutch illustrated in Figures 1 and 2 satisfactory, certain types of forging machines or presses may be improved by the combination of a clutch as described above with a friction slip safety device. To this end I have provided as illustrated in Figure 3 a modified form of flywheel wherein the main wheel section 60 and the rim portion of the flywheel 61 are separably formed. The rim, however, is clamped to the main wheel section through the medium of a clamp ring 62. The abutting faces of the rim 61 and the clamp groove formed in the periphery of section 60 are lined with friction material 63 and 64. The rim 61 may be clamped with sufficient pressure to effect the transmission of the desired torque. In the even of an overload, slippage will occur between the rim portion 61 and the clutch wheel 60 and thus prevent the transmission of torque sufficient to damage the machine. In other respects the clutch mechanism and flywheel assembly of Figure 3 is constructed and functions as in the embodiment heretofore described.

Although preferred embodiments of the invention have been described in considerable detail, it is to be understood that modifications and re-arrangements may be made without departing from the spirit and scope of the invention as defined in the following claims.

I claim:

1. A flywheel mounted on a driven shaft comprising outer rim and web portions supported by a pair of axially spaced parallel bearing portions, a plurality of driven clutch members arranged between said bearing portions in splined engagement with said driven shaft, a plurality of driving clutch members arranged between said bearing portions, an air cylinder circular in cross section mounted co-axially of said driven shaft and secured to said flywheel to rotate therewith, a plunger within said cylinder operatively connected to said clutch members to effect a frictional engagement therebetween.

2. A flywheel and clutch assembly for a forging machine comprising, a driven shaft on said machine rotatably supporting through axially spaced bearings a flywheel, said bearing portions extending radially from the shaft to provide an annular compartment therebetween, driving and driven clutch plates within said compartment, a fluid pressure clutch actuating means supported by said flywheel disposed outside said compartment comprising a cylinder and a plunger, said plunger proportioned to encompass the outer end of the driven shaft.

3. A flywheel mounted on a driven shaft comprising outer rim and web portions supported by a pair of axially spaced parallel bearing portions, a plurality of driven clutch members arranged between said bearing portions in splined engagement with said driven shaft, a plurality of driving clutch members arranged between said bearing portions, an air cylinder circular in cross section mounted co-axially of said driven shaft, a plunger within said cylinder operatively connected to said clutch members to effect a frictional engagement therebetween, a wall extending radially from one of said bearing portions provided with means to selectively determine the position of one of said clutch members with respect to said wall, and a solid radial wall fixed with respect to said other bearing portion to take the thrust of the engaging pressure during clutch actuation.

4. A flywheel mounted on a driven shaft comprising a hub end, an outer rim portion supported by a pair of axially spaced parallel bearing portions extending radially from the hub, driving and driven clutch members arranged between said bearing portions, an air cylinder operatively connected to said clutch members to effect clutch engagement, said cylinder having a head portion fixed to rotate with said bearing portions arranged co-axially with and over the outer end of said shaft.

5. A clutch comprising a driving member rotatably suported at axially spaced points on a driven shaft, annular driving and driven clutch plates arranged between said spaced points, a clutch actuating means comprising a cylinder fixed with respect to said driving member and a plunger movable with respect to said driving member having portions in alignment with said driven shaft.

6. A clutch comprising a driving member rotatably mounted on spaced bearings adjacent the end of a driven shaft, driven clutch plates in splined engagement with said driven shaft arranged between said spaced bearings, driving clutch plates having a splined engagement with said driving member arranged between said spaced bearings, a clutch actuating means comprising a cylinder fixed to rotate with said driving member encompassing said driven shaft and fixed with respect to movement axially of the shaft and an axially movable plunger operatively connected to said clutch plates.

7. A flywheel mounted on a driven shaft comprising an outer rim supported with respect to said shaft by a pair of inner and outer axially spaced parallel bearing portions, driving and driven clutch plates arranged between said bearing portions, a clutch actuating means comprising a plunger secured to one of said clutch plates and proportioned to extend axially beyond said outer bearing portion and encompassing the end of said shaft and a fluid pressure cylinder supported by said flywheel and arranged outside said outer bearing portion to encompass said plunger, spring means to separate said clutch plates to effect disengagement of the clutch and abutment means carried by said outer bearing portion to limit the disengaging travel of said clutch plates.

8. In a clutch assembly for forging machines and the like, a bed frame having a transverse shaft proportioned to project beyond one side thereof, a flywheel rotatably mounted upon said shaft through a pair of axially spaced bearings on the projecting end of said shaft, one of said bearings arranged adjacent the bed frame and the other of said bearings adjacent the extreme outer end of the projecting portion, spaced radial walls extending from said bearings to provide an annular clutch compartment within said flywheel, driven clutch plates splined to said shaft and driving clutch plates splined to said flywheel within said compartment, a fluid pressure cylinder circular in cross section secured to said flywheel outside said outer radial wall, a plurality of apertures formed in said outer radial wall and a fluid pressure plunger within said cylinder encompassing the end of said shaft and having means thereon extending through said apertures and operatively secured to said driving and driven clutch plate assembly within said compartment.

9. In a flywheel and clutch assembly for forging machines and the like, a bed frame having a transverse shaft proportioned to project beyond one side thereof, a flywheel mounted on the projecting portion of said shaft comprising spaced inner and outer radial walls, said inner wall rotatably mounted on said shaft through a bearing immediately adjacent the bed frame and said outer wall rotatably mounted on said shaft through an axially spaced bearing adjacent the extreme outer end of said shaft, a driving and driven clutch plate assembly arranged between said walls, a fluid pressure cylinder removably mounted on said flywheel outside said outer wall, a plurality of apertures formed in said outer wall and a fluid pressure plunger overhanging the extreme outer end of said shaft provided with means extending through said apertures operatively connected to said driving and driven clutch plates.

10. A clutch and flywheel assembly adapted to be mounted upon and encompass the end of a projecting shaft, comprising a rim portion rotatably mounted upon said shaft through a pair of radially extending walls and axially spaced bearings, alternate driving and driven annular clutch plates arranged between said spaced walls and an annular clutch pressure plate mounted between said clutch plates and one of said walls, a fluid pressure cylinder circular in cross section secured to said flywheel and a fluid pressure plunger circular in cross section arranged within said cylinder provided with portions extending through said one wall and secured to said pressure plate.

11. In a clutch for forging machines and the like, a bed frame having a shaft proportioned to project beyond the wall thereof, a flywheel rotatably mounted through axially spaced bearings on said projecting shaft and comprising spaced inner and outer walls, said inner wall arranged adjacent the bed frame, said outer wall provided with a plurality of spaced apertures and a fluid pressure cylinder circular in cross section arranged to overhang and encompass the extreme outer end of said projecting shaft, a fluid pressure plunger mounted within said cylinder and provided with means extending through said apertures, driving and driven clutch members arranged between said walls operatively connected to said means, a plurality of springs arranged to move said plunger toward the head of the cylinder and a fluid pressure inlet at the center of said cylinder in alignment with the axis of said shaft.

12. A clutch and flywheel assembly adapted to be mounted upon and encompass the end of a projecting shaft comprising a rim portion removably mounted upon said shaft through a pair of radially extending walls and axially spaced bearings, driving and driven friction clutch plates arranged between said spaced walls, a third radial wall carried by said rim including a fluid pressure cylinder spaced from and encompassing the end of said shaft, a piston mounted in said cylinder encompassing and spaced from the end of said shaft, and having connecting means extending through the outer of said pair of radially extending walls and effective to force said friction clutch plates together and against the inner of said pair of radially extending walls.

WILLIAM L. CLOUSE.